March 19, 1940.  J. V. ODHNER  2,194,231
TRANSMISSION CONTROL DEVICE
Filed Nov. 20, 1937   2 Sheets-Sheet 1
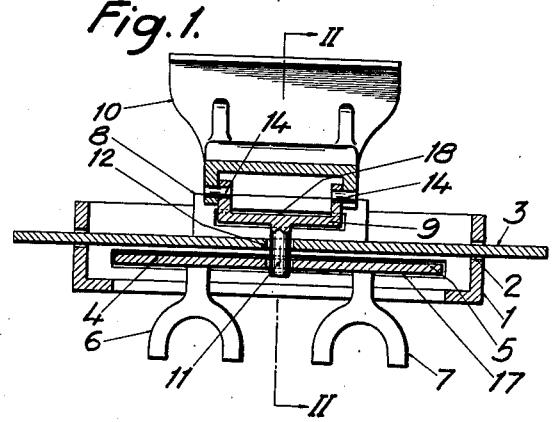
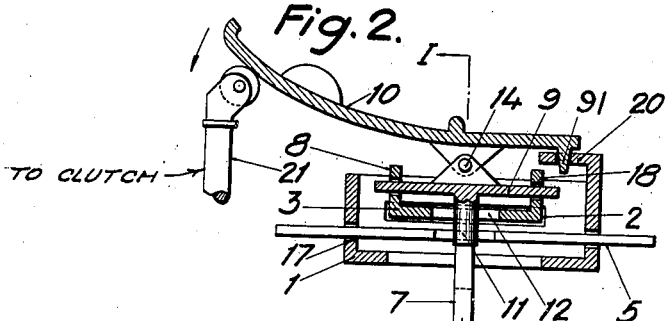
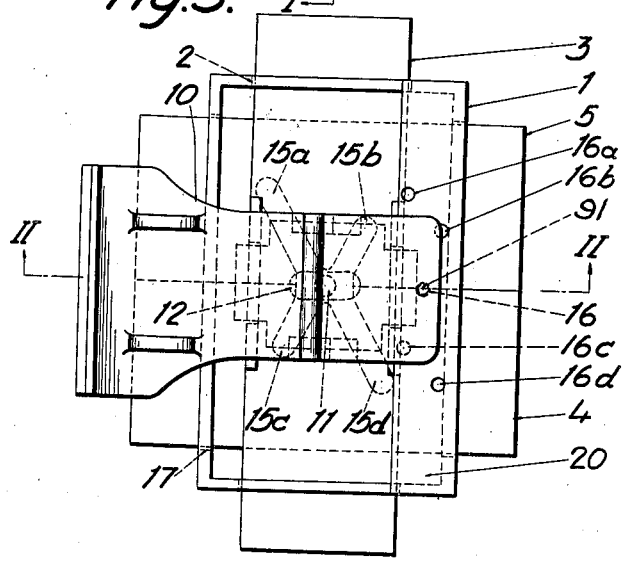
J. V. Odhner
INVENTOR
By: Glascock Downing & Seebold
Attys.

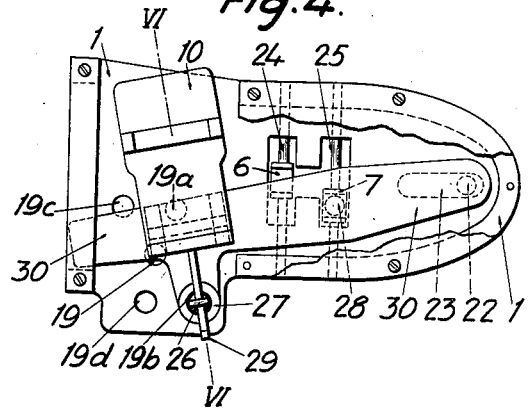
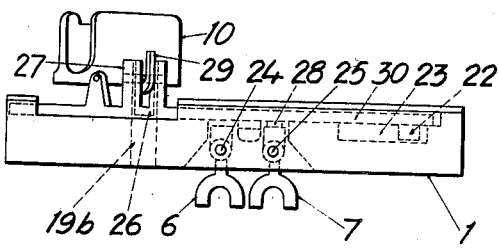
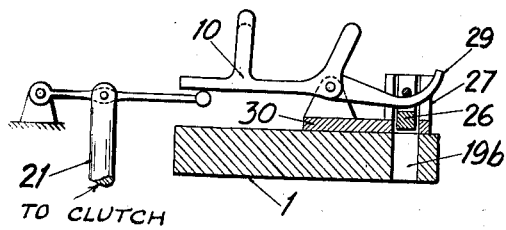

Patented Mar. 19, 1940

2,194,231

UNITED STATES PATENT OFFICE 2,194,231

TRANSMISSION CONTROL DEVICE

Jakob Valentin Odhner, Stockholm, Sweden

Application November 20, 1937, Serial No. 175,706
In Sweden November 21, 1936

9 Claims. (Cl. 192—3.5)

The present invention relates to a device in gear boxes, particularly for automobiles and similar vehicles, of the kind provided with one or more gear wheel actuators shiftable to several different positions (positions of gearing) by means of a pedal device. By means of the present invention, in addition to the advantage of making it possible to shift the speeds or gears by means of one's foot, it is possible to eliminate several other drawbacks connected with the heretofore known constructions and described in the following without, therefore, having to change, in the least way, the ordinary, simple construction of the gear box.

The device according to the invention is characterised substantially thereby that the pad of the pedal, which is adapted, while performing a swinging movement, to engage and disengage respectively the clutch between motor and gear box, is swingably carried by a member, which is movable in at least two different directions of movement, by means of which member the gear wheel actuators are adapted to be moved by the said member from one position of gearing to another only by the foot being moved in various directions in one and the same plane.

Two embodiments of the invention are illustrated on the accompanying drawings, in which Figures 1–3 show one embodiment.

Figure 1 shows the device in section on the line I—I in Figure 2.

Figure 2 shows the device in section on the line II—II in Figures 1 and 3 respectively and Figure 3 shows the device in plan view.

Figures 4–6 show the device according to the other embodiment,

Figure 4 showing the device in plan view, and

Figure 5 showing it in side view,

Figure 6 shows a section on the line VI—VI in Figure 3.

On the drawings 1 indicates a rectangular frame, which by means of suitable members may be attached to the gear box. In the said frame (according to Figures 1–3) there are provided, in two opposite sides, relatively lengthened openings or grooves 2 serving as guides, a plate 3 being movably mounted in the said grooves. In each of the two other opposite sides of the frame there is also provided a relatively lengthened recess 17, in which two plates 4, 5 are guided, which plates are located adjacent to each other and are movable relatively one another. To the lastmentioned plates there are secured the gear wheel actuators 6, 7, which serve for the displacement of the gear wheels.

Further, the plate 3 is provided with two upwardly bent flanges 8, in which grooves 18 are provided, into which a plate 9 extends with its two end portions. The lastmentioned plate serves for carrying the pad 10 of the pedal and is, on its underside, provided with a pin 11, which passes through a somewhat lengthened slot 12, provided in the plate 3, and into recesses 15a, 15b, 15c and 15d, which serve as guides and which are provided in the edge portions of the plates 4, 5, which portions are turned against each other. The pad 10 of the pedal, which is swingable on pins 14, is on its underside at its one end provided with a projection 91. Further, the frame 1 is provided with a flat top portion 20, in which there are a number of holes 16, 16a, 16b, 16c and 16d. 21 indicates a bar, which is united with the clutch and at its top is provided with a swingable roll and which bar, when the clutch is engaged, assumes the position shown in Figure 2 of the drawings, but which bar, by the swinging of the pad 10 in the arrow direction indicated in the said figure, against spring action may be pressed down so far that the projection 91 is able to leave its engagement with that hole of the holes 16—16d, which the projection has entered, by which the clutch is disengaged.

The device operates as follows: When the pad 10 of the pedal assumes its position shown in the drawings the clutch is engaged but all gear wheels in the gear box are in their neutral positions. Thus also the pad assumes neutral position, it being presumed that the gear box, to which the device is applied, is provided with three speeds or gears for forward run and one gear for backward run. If the gear is now to be shifted to the first speed the pad is swung in the arrow direction indicated in Figure 2 by operator depressing his toe portion of the foot by which the pin or the projection 91 is disengaged from the recess 16. Simultaneously therewith also the clutch is disengaged. It is now the question of imparting to the plate 4 a rather short movement of displacement, the pad and the plate 9 respectively being first moved backwards as far as is admitted by the groove 12 in the plate 3. After that the pad 10 together with the plate 3 is moved in such direction sideways that the pin 11 is caused to enter the groove 15d.

On account of the fact that the pin 11, however, together with the plate 3, is now able to perform a movement of displacement only in the longitudinal direction of the lastmentioned plate, the plate 4, on account of the oblique direction of the groove 15d, will receive a movement of displacement directed perpendicularly to the direction of movement of the plate 3. When, finally, the pin 11 has reached the end of the groove 15d, by which the actuator 6 has shifted the respective gear wheel, the pin 91 is located right above the hole 16d. By now giving the pad the possibility of slowly returning to its initial swung position a smooth engaging of the clutch is effected and the gear has now been shifted to the first speed. When shifting to the other speeds the same procedure as the one above described is followed.

From the above description it is seen that it is impossible to engage a gear during the moving of the gear wheels, because the projection 91 then rests against the upper surface of the upper member 20. Such securing against too early engaging of the clutch in the heretofore known devices does not exist. Moreover, in the heretofore used devices it happens that the gear wheel actuator, particularly when driving the vehicle on an uneven road surface, by vibrations or by unintentional actuation, is caused to leave its assumed position of gearing in spite of the fact that the clutch is engaged. In the device according to the invention this cannot happen, because the pad by the cooperation of the projection 91 with the holes 16—16d is prevented from leaving its position of engagement as long as the clutch is engaged. Further, as has heretofore been necessary, it need not be considered that in prior devices the clutch pedal is depressed long enough before it is possible to shift the speeds because, as already mentioned above, a lateral movement of the pad 10 cannot take place until the projection 91 has been liberated by the swinging of the pad.

The embodiment according to Figures 4–6 differs from the hereinbefore described embodiment substantially therein that the part carrying the pad 10 of the pedal consists of a swingable arm 30, the pivot 22 of which extends into a groove 23 provided in the frame 1, which is in the form of a plate. The said groove extends in a direction perpendicular to the direction of motion of the gear wheel actuators 6, 7. As will be seen from the drawings, the gear wheel actuators are in this case movably mounted on shafts 24, 25 fastened into the frame plate 1. A second pin 28, which is secured to the arm 30, by the swinging and moving respectively of the arm, is adapted to cooperate with the gear wheel actuators 6, 7 in such a manner that the latter, by the pad being moved in various directions in one and the same plane, are, in a previously described manner, movable from one position of engagement to another. The pin 91 in the embodiment according to Figures 1–3 in the present embodiment replaced by a cotter 26 or the like, which is guided in a slotted sleeve 27 formed from the arm 30 and which, by means of an extension 29 extending from the pad 10 has jointed connection with the pad. Also in this embodiment the pad is blocked during the moving from one position of engagement to another. Only when the pad assumes its swung position shown on the drawings, in which it holds the clutch in disengaged position, i. e. when the cotter 26 is held out of engagement with the holes 19, 19a, 19b, 19c and 19d provided in the frame plate 1, may the arm 30 and the pin 28 respectively be brought to cooperate with and displace respectively the gear wheel actuators.

In the above described embodiment the pins 22 and 28 may change places without inconvenience and also the pin 22 may be mounted stationarily in the plate 1, in which case the groove 23 is provided in the arm 30. Also other modifications than the ones above described and indicated may be devised within the scope of the invention.

Having now described my invention, what I claim as new and desire to secure by Letters Patent is:

1. A transmission control device comprising a clutch control pedal, means mounting said pedal for clutch engaging and disengaging movement, a gear wheel actuator shiftable to different positions, said mounting means being movable in at least two directions in a plane other than that in which the pedal is movable in actuating the clutch, and means for coupling the mounting means with the actuator for transmitting the movement of said mounting means to said actuator.

2. A transmission control device as claimed in claim 1 characterized by the provision of means operable during the shifting of the gear wheel actuator under the control of the mounting means to lock the pedal in clutch disengaging position.

3. A transmission control device as claimed in claim 1 characterized by the provision of means controlled by the clutch pedal when the latter is in clutch engaging position, to lock the mounting means and the actuator in adjusted position.

4. A clutch control device as claimed in claim 1, characterized in that said mounting means is movable rectilinearly in two directions to effect shifting movement of the gear wheel actuator.

5. A transmission control device as claimed in claim 1 characterized in that said mounting means is pivoted about a movable axis.

6. A transmission control device comprising a clutch control pedal, means mounting said pedal for clutch engaging and disengaging movement, independently movable members, gear wheel actuators carried by said members, said mounting means being movable in a direction perpendicular to the direction of movement of said members, and means carried by the mounting means and movable therewith to engage and displace the respective members to shift said actuators.

7. A transmission control device comprising a clutch control pedal, means mounting said pedal for clutch engaging and disengaging movement, means supporting said mounting means for combined axial and swinging movement, gear wheel actuators shiftable to different positions, and means on said mounting member engageable with said actuators for shifting the latter incident to the axial and swinging movement of said mounting means.

8. A transmission control device as claimed in claim 6, characterized by the provision of means to lock said pedal in clutch disengaging position while the gear wheel actuators are in the process of being shifted out of one gear and into another.

9. A transmission control device as claimed in claim 7, characterized by the provision of means to lock said pedal in clutch disengaging position while the gear wheel actuators are in the process of being shifted out of one gear and into another.

JAKOB VALENTIN ODHNER.